United States Patent
Kamada et al.

(10) Patent No.: US 10,106,919 B2
(45) Date of Patent: Oct. 23, 2018

(54) DRAWING DEVICE AND DRAWING METHOD

(71) Applicant: KURARAY CO., LTD., Kurashiki-shi (JP)

(72) Inventors: Hideki Kamada, Okayama (JP);
Teruyuki Itami, Okayama (JP);
Toshiaki Ikimine, Okayama (JP); Yohei Nishiumi, Okayama (JP); Shohei Shibata, Okayama (JP); Toshiji Kashiwagi, Osaka (JP)

(73) Assignee: KURARAY CO., LTD., Kurashiki-shi (JP)

( * ) Notice: Subject to any disclaimer, the term of this patent is extended or adjusted under 35 U.S.C. 154(b) by 500 days.

(21) Appl. No.: 14/751,261

(22) Filed: Jun. 26, 2015

(65) Prior Publication Data
US 2015/0292127 A1 Oct. 15, 2015

(30) Foreign Application Priority Data

Dec. 28, 2012 (JP) .................................. 2012-287690

(51) Int. Cl.
*D02J 1/22* (2006.01)
*B29C 55/04* (2006.01)
(Continued)

(52) U.S. Cl.
CPC .............. *D02J 1/225* (2013.01); *B29C 55/04* (2013.01); *D01D 5/16* (2013.01); *D01D 10/0445* (2013.01);
(Continued)

(58) Field of Classification Search
CPC .... D02J 1/22; D02J 1/225; D02J 1/226; D02J 1/228; D02J 1/224; D02J 1/227;
(Continued)

(56) References Cited

U.S. PATENT DOCUMENTS 1,778,111 A * 10/1930 Kocks ..................... B21B 19/08
72/97
2,174,688 A * 10/1939 Cotchett .................. D04D 1/00
28/244

(Continued)

FOREIGN PATENT DOCUMENTS

CN 1354288 A 6/2002
CN 102373525 A 3/2012
(Continued)

OTHER PUBLICATIONS

English language machine translation of JP 50-145610 (Pub. Nov. 1975); 4 pages.*
(Continued)

*Primary Examiner* — Amy Vanatta
(74) *Attorney, Agent, or Firm* — Oblon, McClelland, Maier & Neustadt, L.L.P.

(57) ABSTRACT

A drawing device for drawing a drawable material, the drawing device comprising at least a pair of tapered rollers each having a taper ratio in a range of 0.035 to 0.50, wherein the taper ratio is represented by $(\beta-\alpha)/2L$, where $\beta$ denotes a maximum diameter of the roller, $\alpha$ denotes a minimum diameter of the roller, and L denotes a length of a tapered portion of the roller.

17 Claims, 5 Drawing Sheets

(51) Int. Cl.
*D02J 13/00* (2006.01)
*D01D 10/04* (2006.01)
*D01D 5/16* (2006.01)

(52) U.S. Cl.
CPC .............. *D02J 1/224* (2013.01); *D02J 1/226* (2013.01); *D02J 1/228* (2013.01); *D02J 13/005* (2013.01)

(58) Field of Classification Search
CPC ..... D02J 13/005; D01D 5/16; D01D 10/0445; D01D 5/098; B29C 55/00; B29C 55/005; B29C 55/02; B29C 55/04; B29C 55/045; B29C 55/06; B29C 55/065; B29C 55/10; D06C 3/06
USPC ................ 492/27; 28/240; 264/288.4, 290.5, 264/290.7, 291, 290.2
See application file for complete search history.

(56) References Cited

U.S. PATENT DOCUMENTS

| | | | | |
|---|---|---|---|---|
| 2,185,245 | A * | 1/1940 | Cotchett | D04D 1/00 242/485.3 |
| 2,208,497 | A * | 7/1940 | Coleshill | D01G 1/04 19/0.3 |
| 2,346,696 | A | 4/1944 | Moritz et al. | |
| 2,372,627 | A | 3/1945 | Goggin et al. | |
| 2,539,978 | A * | 1/1951 | Van Dijk | D01D 10/0436 226/184 |
| 2,553,127 | A * | 5/1951 | Barker | D01D 10/0445 242/364.12 |
| 2,736,944 | A * | 3/1956 | Herbert | D02J 1/226 28/244 |
| 3,387,833 | A * | 6/1968 | Whittaker | D01D 10/02 219/388 |
| 3,551,550 | A * | 12/1970 | Bauer | D01F 6/62 264/210.7 |
| 3,978,192 | A | 8/1976 | Sussman | |
| 4,554,713 | A | 11/1985 | Chabal | |
| 4,784,344 | A | 11/1988 | Lenk et al. | |
| 4,789,509 | A * | 12/1988 | Ikeda | D01F 9/14 264/136 |
| 4,817,880 | A | 4/1989 | Lenk et al. | |
| 4,891,872 | A | 1/1990 | Sussman | |
| 4,980,957 | A * | 1/1991 | Sussman | B29C 55/00 264/290.5 |
| 5,340,523 | A * | 8/1994 | Sussman | B29C 55/00 264/205 |
| 5,421,070 | A * | 6/1995 | Lenk | D02J 13/005 219/211 |
| 5,928,579 | A | 7/1999 | Spahlinger et al. | |
| 6,427,300 | B2 | 6/2002 | Naito et al. | |
| 2001/0027636 | A1 | 10/2001 | Naito et al. | |
| 2004/0140260 | A1 | 7/2004 | Morimura | |
| 2007/0289919 | A1 | 12/2007 | Morimura | |

FOREIGN PATENT DOCUMENTS

| | | |
|---|---|---|
| EP | 1 130 142 A1 | 9/2001 |
| EP | 1 437 167 A1 | 7/2004 |
| EP | 2 415 915 A1 | 2/2012 |
| GB | 1 252 764 A | 11/1971 |
| JP | 27-4422 | 10/1952 |
| JP | 47-042842 | 10/1972 |
| JP | 48-28371 B1 | 8/1973 |
| JP | 50-083516 | 7/1975 |
| JP | 50-145610 | 11/1975 |
| JP | 54-8767 B | 4/1979 |
| JP | 60-110909 A | 6/1985 |
| JP | 62-250214 A | 10/1987 |
| JP | 2-42075 | 3/1990 |
| JP | 3-504258 | 9/1991 |
| JP | 06-004704 | 1/1994 |
| JP | 07-033610 | 4/1995 |
| JP | 9-228138 A | 9/1997 |
| JP | 2004-232159 A | 8/2004 |
| JP | 2006-283251 A | 10/2006 |
| WO | WO 89/10831 | 11/1989 |

OTHER PUBLICATIONS

Combined Chinese Office Action and Search Report dated Mar. 21, 2016 in Patent Application No. 201380068464.X (with English translation of Search Report and English translation of categories of cited documents).
Office Action dated Dec. 1, 2016 in Chinese Patent Application No. 201380068464.X (with English summary).
Office Action dated Aug. 31, 2017 in Korean Patent Application No. 10-2015-7016833 (with partial English translation).
International Search Report dated Apr. 1, 2014 in PCT/JP2013/085175 filed Dec. 27, 2013.
International Preliminary Report on Patentability and Written Opinion dated Jul. 9, 2015 in PCT/JP2013/085175 (submitting English translation only).
Extended European Search Report dated Jul. 13, 2016 in Patent Application No. 13868678.7.
Japanese Office Action dated Jul. 26, 2016 in Patent Application No. 2014-554605 (with partial English translation).

* cited by examiner

DRAWING DEVICE AND DRAWING METHOD

CROSS REFERENCE TO THE RELATED APPLICATION

This application is a continuation application, under 35 U.S.C. § 111(a), of international application No. PCT/JP2013/085175, filed Dec. 27, 2013, which claims priority to Japanese patent application No. 2012-287690, filed Dec. 28, 2012, the entire disclosure of each of which is herein incorporated by reference as a part of this application.

FIELD OF THE INVENTION

The present invention relates to a drawing device and a drawing method capable of drawing drawable materials such as fibers or tapes at a high draw ratio during manufacturing synthetic fibers or film-shaped materials. Specifically, the present invention relates to a drawing device and a drawing method that allow high ratio drawing and are applicable to drawing of various fibers, tapes, or sheets composed of crystalline polymers such as polyester, nylon, polyethylene, polypropylene, polyvinyl alcohol, and polyoxymethylene.

BACKGROUND ART

Drawing of synthetic fibers at a high draw ratio has been performed in order to increase strength and/or elastic modulus of the synthetic fibers. For example, in order to increase initial elastic modulus of a polyester fiber, JP Examined Patent Publication No. H06-4704 describes a method including: a first step of taking up (winding) an undrawn fiber obtained by melt spinning; a second step of subsequently drawing the fiber while heating the fiber by a preliminary heating roller, where the second step is repeated twice; and a third step of heat treating the fiber. As a result, a highly elastic polyester fiber having low shrinkage property can be obtained. In a method of JP Examined Patent Publication No. H07-33610, in order to obtain a polyester fiber having a high modulus, excellent dimensional stability, and high toughness, without passing a winding step after the spinning, an undrawn fiber obtained by melt spinning is continuously subjected to drawing and subsequent heat treatment, where the drawing is performed by repeating a step of preheating the fiber by a roller heated at 80 to 110° C. and drawing the fiber for three times. As a result, a polyester fiber having a high modulus, excellent dimensional stability, and high toughness can be obtained.

Ordinary rollers are used for the drawing in the above-exemplified method. As an example of using a taper shaped roller as a part of a drawing device, JP Laid-open Patent Publication No. S50-83516 describes a heat drawing between Nelson type feed rollers and draw rollers. Such a method includes a problem in that yarns on the preheated feed roller may be loosened due to thermal elongation, resulting in swaying of yarns on the roller. In order to solve this problem, JP Laid-open Patent Publication No. S50-83516 describes a method in which one of the feed rollers is made to have a tapered shape so as to eliminate the looseness of the yarns.

As another example of using a taper-shaped roller as a part of a drawing device, JP Examined Patent Publication No. S47-42842 describes preliminary drawing using a taper-shaped roller.

SUMMARY OF THE INVENTION

Even when drawing is performed by two-step drawing or three step drawing as disclosed in JP Examined Patent Publication No. H06-4704 and JP Examined Patent Publication No. H07-33610, the total draw ratio (the product of draw ratios at respective drawing steps) is at most about 1.7 to 2.4 times. In order to increase the draw ratio, drawing at still higher draw ratio can be expected by increasing numbers of heating rollers to perform four, five or more stages drawing. However, such a process requires long and large facilities. Therefore, drawing steps using the drawing device are substantially limited to two to four steps at the most.

A tapered roller is used in the method of JP Laid-open Patent Publication No. S50-83516. However, this tapered roller is not used for a purpose of drawing, but is used for a purpose of eliminating looseness of fibers on the roller, and the fibers are drawn by utilizing difference in speed between the feed roller and the draw roller.

The method of JP Examined Patent Publication No. S47-42842 includes preliminary drawing using a tapered roller. The tapered roller is combined with a non-tapered separate roller in a drawing device used for the preliminary drawing, where the looseness of fibers is eliminated by the preliminary drawing at a draw ratio of 1.1 times or less. On the other hand, there is no suggestion for performing main drawing using the tapered roller. Main drawing is performed between the separate roller and a draw pin.

Where fibers composed of crystalline polymer are drawn at specifically high draw speed, it is difficult to draw the fiber by a single stage drawing at a high draw ratio, and incremental drawing, that is, multi-stage drawing is required. Therefore, in the drawing of polyester fibers or polyamide fibers, after achieving an undrawn fiber by melt spinning, directly or via a winding step, the melt-spun fiber is subjected to drawing, where the fiber is heated to an appropriate temperature using a heating roller, and is progressively drawn utilizing speed differences between a plurality of rollers, and thereby obtaining a fiber having high strength, high elastic modulus, and excellent dimensional stability. However, in the drawing device by which drawing is performed utilizing speed differences between a plurality of rollers, number of drawing stage is actually limited to 2 to 4 stages due to restrictions for size and/or building cost of the drawing device. Thus, it is difficult to obtain a fiber at a further high draw ratio when economical rationality is taken into consideration.

As an object to solve the above-described problems in the conventional art, the inventors of the present invention investigated to provide a compact device that allows multi-stage drawing and a multi-stage drawing method using the same device.

As a result of thorough research, the inventors have found that multi-stage drawing is enabled by configuring a drawing device with a pair of tapered rollers and repeatedly spanning the tapered rollers with a drawable material (wrapping a drawable material around the tapered rollers), and increasing the number of times of spanning the rollers with the drawable material. The present invention was achieved based on this finding.

In the present invention, the term "drawable material" is used as a term to denote a material to be drawn, where the material includes a yarn, a tape, or a sheet composed of a thermoplastic resin. In the present invention, the "yarn" refers to a single fiber (including a monofilament) or a single-fiber assembly (including a multifilament and a multifilament bundle) which is to be drawn. Examples of the single-fiber assembly include a bundle of a large number of (10 to 2000, preferably 50 to 1000) single fibers arranged parallel. In the present invention, the "tape or sheet" means a thermoplastic resin tape (for example, having a width of 0.001 to 200 mm, preferably 0.01 to 30 mm) or thermoplastic resin sheet (for example, having a width of 0.001 to 200 mm, preferably 0.01 to 30 mm) (also referred to as an elongate sheet or a strip sheet) which is to be drawn.

In the present invention, "multi-stage drawing (plural-stage drawing)" denotes drawing of the drawable material a plurality of times between rollers having different circumferential speeds. Where the pair of tapered rollers is spanned with the drawable material a plurality of times, drawing is performed at different draw ratios a plurality of times, whereby multi-stage (mult-step) drawing is performed.

A first aspect of the present invention is a drawing device for drawing a drawable material, the device including at least one pair of tapered rollers each having a taper ratio in a range of 0.035 to 0.50, where the taper ratio is represented by $(\beta-\alpha)/2L$, where $\beta$ denotes a maximum diameter of the roller, $\alpha$ denotes a minimum diameter of the roller, and L denotes a length of a tapered portion of the roller.

A ratio $(\beta/\alpha)$ between the maximum diameter $(\beta)$ and the minimum diameter $(\alpha)$ of each of the tapered roller is preferably in a range of 1.2 to 5.0.

Each of the tapered roller preferably includes non-tapered straight portions at a portion where the drawable material is introduced onto the roller and at a portion where the drawn material is delivered from the roller.

The pair of tapered rollers is preferably arranged such that an angle ($\theta$) formed between center axes of the rotation shaft of the pair of rollers is in a range of $20°\geq\theta\geq0.001°$.

A surface of each tapered roller is preferably heated at a predetermined temperature, and the surface of each tapered roller is preferably heated by internal heating or by external heating.

Preferably, each tapered roller includes a plurality of heating zones that are partitioned along a lengthwise direction of the roller, and temperatures of the respective heating zones are controllable individually.

The drawing device may include a plurality of the pairs of tapered rollers such that multi-stage drawing of the drawable material can be performed a plurality of times.

The drawable material may be a yarn, and the yarn may be a monofilament yarn or a multifilament yarn. The pair of tapered rollers is preferably arranged adjacent to a spinning device so as to draw the spun yarn directly after spinning without winding the yarn.

The drawable material may be a tape or a sheet composed of thermoplastic resin. The tape or the sheet composed of thermoplastic resin may be a film directly formed in a tape-shape or a sheet-shape or may be formed by slitting a film-shaped material having a wide width.

A second aspect of the present invention is a drawing method including: using a drawing device having at least one pair of tapered rollers each having a taper ratio in a range of 0.035 to 0.50; spanning the pair of tapered rollers with a drawable material; and drawing the drawable material by running the drawable material while spanning the pair of the tapered rollers with the drawable material a plurality of times from the small diameter side to the large diameter side of the rollers, wherein the taper ratio is expressed by $(\beta-\alpha)/2L$, where $\beta$ denotes a maximum diameter of the roller, $\alpha$ denotes a minimum diameter of the roller, and L denotes a length of a tapered portion.

The drawable material may be a yarn. In the present invention, the yarn is composed of one or a plurality of continuous single fibers which have been undrawn or drawn after spinning.

In the drawing method, the yarn is preferably introduced to the tapered rollers without being wound after spinning.

Preferably, the tapered rollers are heated, and the yarn is heated by the heated rollers and is subjected to drawing.

The plurality of times is preferably equal to or greater than 6 times.

A further high draw ratio can be achieved by performing multi-stage drawing of the yarn a plurality of times using a drawing device including a plurality of pairs of tapered rollers.

In the drawing method, the drawable material may be a tape or a sheet composed of thermoplastic resin.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

In addition, in order to avoid redundancy, the features disclosed according to the device are regarded as being disclosed according to the method, and similarly, the features disclosed according to the method are regarded as being disclosed according to the device.

The drawing device of the first aspect of the present invention includes a pair of tapered rollers, and enables multi-stage drawing by spanning the tapered rollers with drawable material a plurality of times with a compact constitution. Therefore, it is possible to perform multi-stage drawing while avoiding the use of long and large facilities. Further, since each of the tapered roller has non-tapered straight portions at which the drawable material is introduced onto the roller and the drawn material is delivered from the roller, it is easy to introduce the drawable material onto the rollers and deliver the drawn material from the rollers. Since the pair of tapered rollers are arranged such that the angle ($\theta$) formed between the center lines of rotation axes of the pair of rollers is in a range of $20°\geq\theta\geq0.001°$, the drawable material can smoothly move from the small-diameter side to the large-diameter side, ensuring stable drawing conditions. In addition, heating of the rollers enables drawing at a desired drawing temperature. Where the roller is partitioned to a plurality of zones along the lengthwise direction of the roller such that the roller surface is controlled to have a desired temperature, the surface temperature can be controlled in detail to an optimum drawing temperature. A plurality of pairs of the tapered rollers can be arranged in serial arrangement along the running direction of the drawable material. Therefore, it is possible to increase the number of spanning to any number, and multi-stage drawing with extremely large number of stages is enabled.

Since the drawing device can be arranged adjacent to a spinning device, spinning and drawing can be performed continuously without winding the as-spun fiber before drawing.

According to the drawing method of the second aspect of the present invention, by spanning the pair of tapered rollers with the drawable material and drawing the drawable material by running the material while spanning with the material a plurality of times from the small-diameter side to the large-diameter side of the tapered rollers, drawing at a high draw ratio of 1.2 times or higher is enabled using a compact device comprising a single pair of tapered rollers. It is possible to span the rollers with the drawable material a plurality of times, e.g., 6 times or more, thereby enabling high ratio drawing while reducing the deformation rate of the drawable material compared to the conventional drawing method, and performing desired multi-stage drawing using a compact device.

Where the drawable material is a yarn, it is possible to simplify the process by performing drawing directly after the spinning in the spinning apparatus. The drawing can be performed at a desired temperature by using heating rollers.

BRIEF DESCRIPTION OF THE DRAWINGS

The present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

DESCRIPTION OF EMBODIMENTS

Drawing Device

Figure 1:
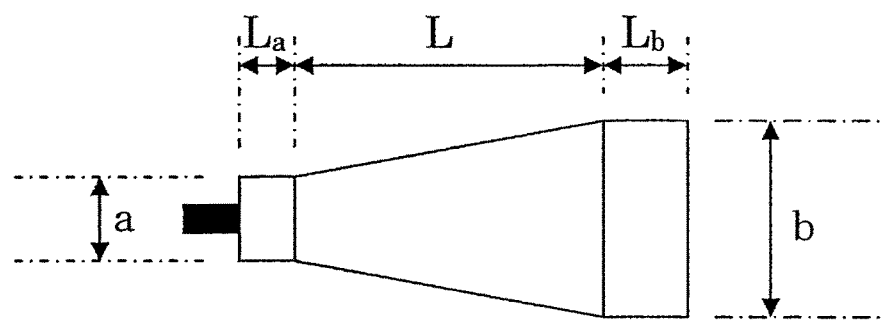
FIG. 1 is a schematic front view showing an example of a tapered roller used in a drawing device of the present invention, where "L" denotes a length of a tapered portion of the tapered roller, "La" denotes a length of straight portion at small-diameter side of the tapered roller, "Lb" denotes a length of a straight portion at large-diameter side of the tapered roller, "a" denotes a diameter ($\alpha$) of the roller at small-diameter side of the tapered roller, and "b" denotes a diameter ($\beta$) of the roller at large-diameter side of the tapered roller.

The characteristic of the present invention is in that a drawable material such as a spun yarn after spinning or a tape or sheet after molding is introduced to a pair of tapered rollers (i) directly, (ii) after taking up the drawable material by a take-up roller, or (iii) after winding the drawable material; and the drawable material is drawn through rotation of the tapered rollers. FIG. 1 shows an embodiment of a tapered roller used in the present invention.

Figure 2:
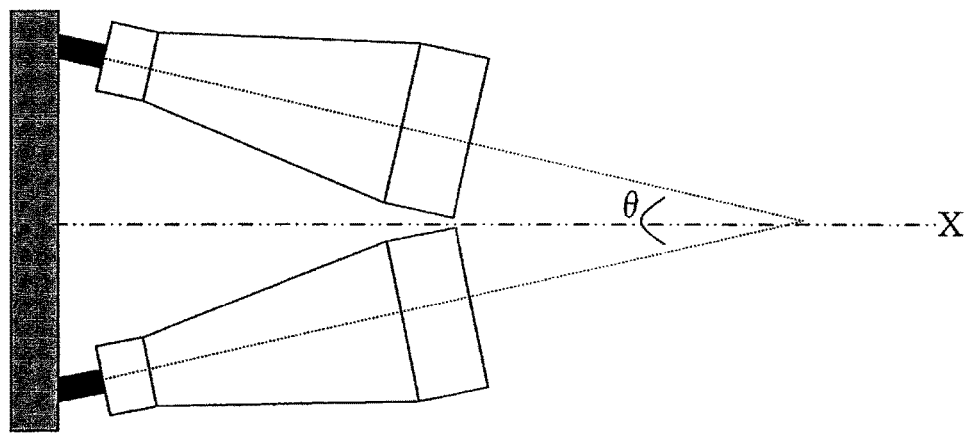
FIG. 2 is a schematic front view showing an example of arrangement of a pair of tapered rollers used in the drawing device of the present invention.

As shown in an embodiment illustrated in FIG. 2, a drawing device of the present invention is configured with a pair of tapered rollers that is constituted of two tapered rollers each having a constitution as shown in FIG. 1. Normally, the two rollers which constitute the pair of tapered rollers preferably have the same size for adjusting the speed such that the rollers are rotatable at the same speed in the same direction. The pair of the rollers are driven for rotation, normally, by driving the driving shaft of the each of the rollers constituting the pair while synchronizing driving motors of the pair of rollers. Alternatively, it is possible to provide a connector (connection unit) to connect the driving shafts of the pair of rollers, and rotating the rollers by driving the connector using a single motor.

The two rollers may have a different configuration, where the rollers are generally configured to have the same L, La, Lb, and $\beta/\alpha$ and the rotation speed of each roller is controlled such that the two rollers have the same circumferential speeds at each of corresponding portions. As shown in FIG. 4C, the drawable material such as a yarn is introduced to an introduction portion (X) at the small-diameter side of the pair of tapered rollers, and spans the rollers a plurality of times such that the running yarn is drawn by a differences in circumferential speeds on the surface of the roller. This process is repeated multiple times (over multiple stages), whereby the drawable material is continuously drawn at a high draw ratio of at least 1.2 times or higher. Then, the drawn material is delivered from a delivery portion (Y) at the large-diameter side.

Tapered Rollers

It is necessary that each tapered roller used in the present invention includes a tapered portion having a minimum diameter ($\alpha$) and a maximum diameter ($\beta$) and also having a predetermined length (L) which allows drawing of the drawable material such as a yarn. Preferably, as shown in FIG. 1, each tapered roller includes a tapered portion (L) with a predetermined length, a straight portion (La) with a predetermined length to which the drawable material is introduced, and a straight portion (Lb) with a predetermined length from which the drawn material is delivered. The ratio between the maximum diameter ($\beta$: "b" in FIG. 1) and the minimum diameter ($\alpha$: "a" in FIG. 1), the roller length (L) of the tapered portion, the roller length (La) of the introduction straight portion, and the roller length (Lb) of the delivery straight portion may be selected arbitrarily based on the type of the drawable material subjected to drawing, a draw ratio, physical properties of the drawable material after drawing, and the like. Preferably, the drawing is performed while setting these values within the ranges indicated by the following formulas (1) to (5).

$$1.2 \leq \beta/\alpha \leq 5.0 \tag{1}$$

$$0.035 \leq (\beta-\alpha)/(2L) \leq 0.50 \tag{2}$$

$$50 \leq L \leq 2000 \text{ (mm)} \tag{3}$$

$$0 \leq La \leq 500 \text{ (mm)} \quad (4)$$

$$0 \leq Lb \leq 500 \text{ (mm)} \quad (5)$$

In the above formula (1), β/α is a parameter which determines a total draw ratio. Where β/α is smaller than 1.2, it is difficult to increase the draw ratio. Where β/α is larger than 5.0, the drawing is performed with high draw ratio at each stage, resulting in severe elongation and deformation rate. As a result, fluffing or yarn breakage easily occurs, and it is difficult to perform normal drawing continuously. A more preferable range for the parameter (β/α) is 1.3≤β/α≤3.5. The tilt may be changed continuously or stepwise as long as β/α is within the above range.

In the above formula (2), (β−α)/(2L) is a parameter which determines an angle of the taper. Where (β−α)/(2L) is smaller than 0.035, the drawing efficiency at the tapered rollers is low due to the low taper angle. Such a case is not preferred, since a large roller length L is required to achieve a predetermined draw ratio, resulting in a large facility. Where (β−α)/(2L) is higher than 0.50, excessively large taper angle disturbs the movement of the drawable material toward the large diameter side of the tapered rollers against the inclination of the roller surface. Therefore, it is preferable to design the rollers such that 0.1≤(β−α)/(2L)≤0.35 is satisfied.

The above formula (3) indicates a range for the length L (mm) of the tapered portion. Where L is smaller than 50 (mm), the number of spanning the rollers (stages of drawing) is limited to small number of times (stages), causing disadvantage in continuous drawing efficiently. Thus, L of smaller than 50 (mm) is not preferred. On the other hand, where L is larger than 2000 (mm), not only the facility size increases, but also the operability by an operator tends to be disturbed. Desirably, 300≤L≤1200 (mm) is satisfied.

The above formulas (4) and (5) indicate a preferable range for the roller length (La mm) of the straight portion at the small-diameter side and a preferable range for the roller length (Lb mm) of the straight portion at the large-diameter side, respectively. The drawable material is drawn at the tapered portion. In order to guide the drawable material to the tapered portion and to guide the drawable material to the next step after completion of the drawing at the tapered portion, it is advantageous for operation to provide straight portions having an appropriate length of 0≤La≤500 (mm) and 0≤Lb≤500 (mm), respectively. The rollers may not have the straight portions. La or Lb of larger than 500 (mm) is not preferred since the increased facility size results in inverse effect causing disadvantage in operability. More desirably, La and Lb are within the ranges of 20≤La≤300 (mm) and 20≤Lb≤300 (mm), respectively. Where necessary, flanges for preventing the drawable material from coming off the rollers may be provided on an end surface at the small-diameter side and on an end surface at the large-diameter side of the rollers.

Arrangement of Two Tapered Rollers

The drawing device of the present invention is constituted of at least a pair of tapered rollers, that is, a set of two tapered rollers. Normally, center axes of rotation shafts (rotation axes) of the two rollers are parallel to each other. The drawable material such as a yarn is introduced to the small-diameter side of the rollers, and runs while spanning the two tapered rollers a plurality of times, and the drawn material is delivered from the large-diameter side. Since a force to pull back the drawable material to the small-diameter side acts on the running drawable material, it is preferable to arrange the two rollers such that leading ends thereof are directed inward as shown in FIG. 2, FIG. 4A, FIG. 4B, and FIG. 4C so as to have the drawable material runs stably. Specifically, a projection angle θ° between the center axes of rotation shafts of the two rollers as shown in FIG. 2 is preferably selected from a range indicated by the following formula 6.

$$0.001° \leq \theta \leq 20° \quad (6)$$

Figure 4A:
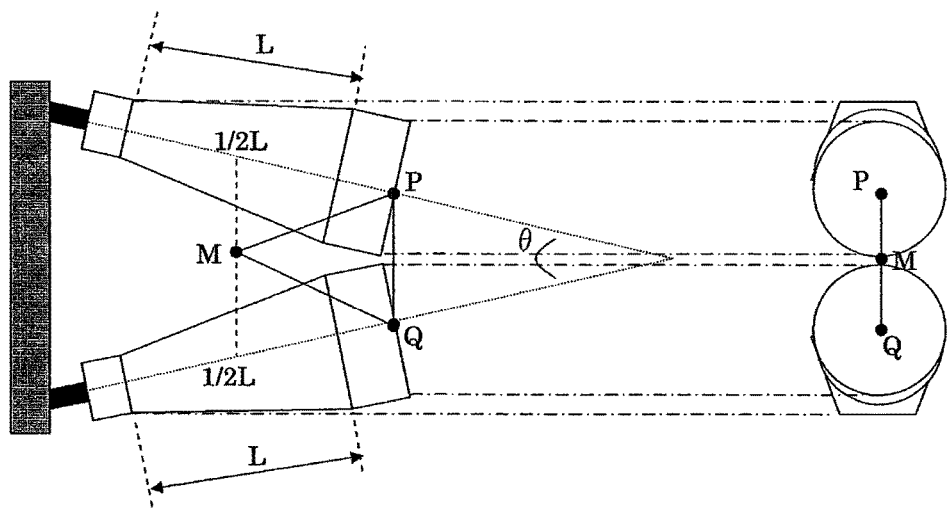
FIG. 4A is a schematic front view and a schematic side view showing an example of the arrangement of the pair of tapered rollers constituting the drawing device of the present invention.
Figure 4B:
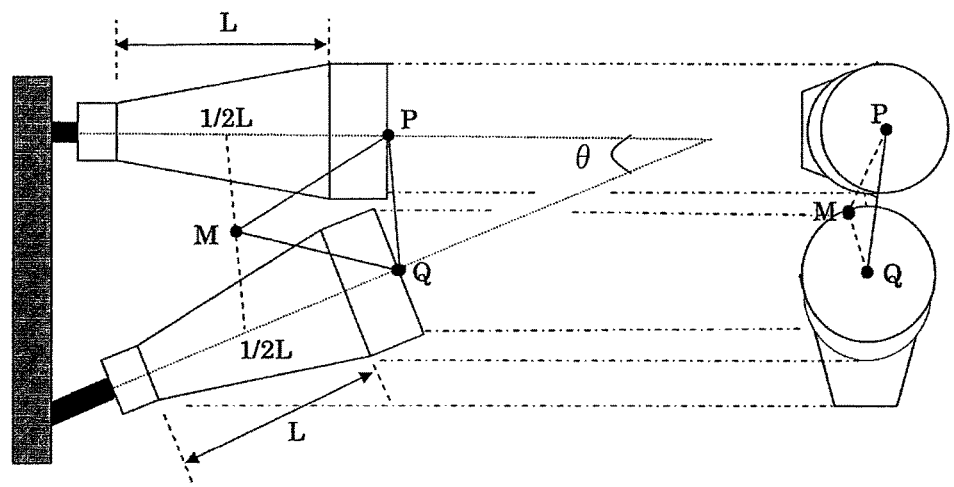
FIG. 4B is a schematic front view and a schematic side view showing another example of the arrangement of the pair of tapered rollers constituting the drawing device of the present invention.
Figure 4C:
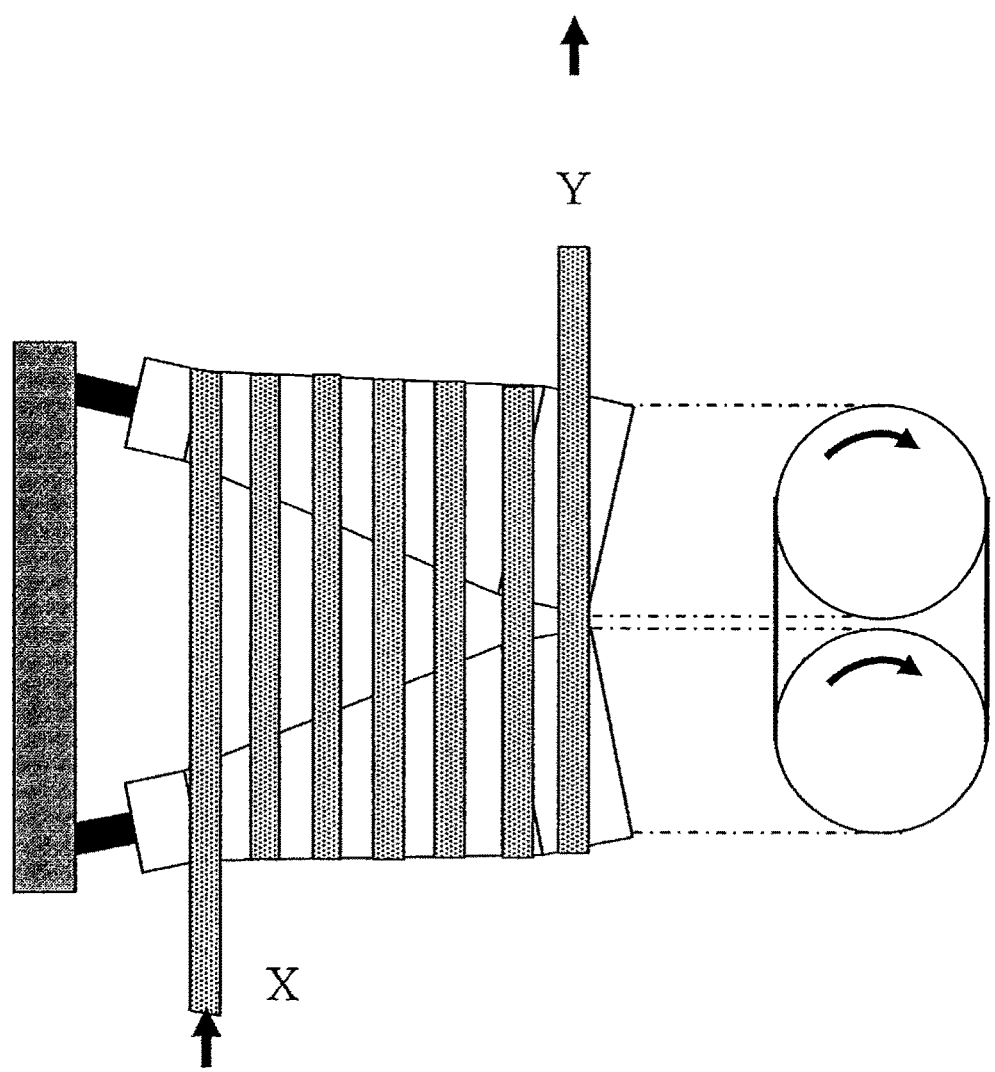
FIG. 4C is a schematic front view and a schematic side view showing a state of a drawable material (yarn) during drawing by the pair of tapered rollers constituting the drawing device of the present invention.

In the above formula, θ indicates an angle which is formed between the center axes of rotation shafts and obtained when the center axis of rotation shaft of each of the two rollers are projected on the same plane including P, Q, and M shown in FIG. 4A and FIG. 4B. P and Q indicate center points of rotation shafts on the ends of the large-diameter sides of the rollers as shown in cross-sectional views of the rollers in FIG. 4A and FIG. 4B. M indicates the midpoint of a line connecting rotation center axes at positions (½L) corresponding to ½ of the length L of the tapered portions of the respective rollers.

In the drawing device of the present invention, the drawable material such as a yarn gradually moves from the small-diameter side to the large-diameter side, where the drawable material is drawn in accordance with increasing surface speed of the rollers. Where the drawable material spans the pair of tapered rollers a large number of times, the drawable material is drawn at multiple (plural) stages. Thus, a drawn material which has been drawn at a high draw ratio can be obtained.

However, when the drawable material is caused to move from the small-diameter side to the large-diameter side, that is, in a direction in which the speed increases, a force in the opposite direction acting to move the drawable material from the large-diameter side to the small-diameter side is also generated. In order to move the drawable material from the small-diameter side to the large-diameter side against the force, generation of appropriate mechanical stress is desired. In order to generate the stress, the device is preferably configured such that the directions of the rotation shafts of the two rollers are changeable to allow the projection angle θ between the center axes of rotation shafts of the two rollers to be selected from the range of 0.001°≤θ≤20°.

As θ increases, the stress to move the drawable material from the small-diameter side to the large-diameter side increases, and the drawable material naturally moves to the large-diameter side. A set angle of θ is determined according to the type of the drawable material, a draw ratio, the fineness of a fiber shaped drawable material or the width of a tape or sheet shaped drawable material, a drawing temperature, a drawing speed, drawing tension, shrinkage stress, or the like. Proper value is different depending on each condition, and thus it is difficult to unconditionally determine an optimum range for θ. Therefore, the continuous drawing device preferably has a mechanism that allows free adjustment of the angle θ in the range of 0.001°≤θ≤20°. Where θ is excessively small, an effective force is not generated. Where θ is excessively large, it is not preferable since the drawable material moves largely, and sufficient numbers of drawing stages cannot be ensured for the continuous drawing. More desirably, 0.5°≤θ≤10° is satisfied.

As a method of determining the angle θ, θ is generally determined as an angle between extensions of the rotation center axes of the two rollers when the rotation center axes are on a plane including P, Q, and M as shown in FIG. 4A. On the other hand, the same effect is obtained, for example, by tilting one or both of the rotation center axes of the two rollers in the bilateral direction as shown in FIG. 4B. In this case, θ is determined as an angle obtained by projecting the rotation center axes of the two rollers on a plane including P, Q, and M.

Here, P and Q indicate the center points of the rotation shafts on the ends of the large-diameter side of the respective rollers, and M indicates the midpoint of the line connecting the rotation center axes at the positions (½L) corresponding to ½ of the length L of the tapered portions of the respective rollers.

In the embodiment shown in FIG. 4C, the two rollers are appropriately tilted, and the length of the drawable material between the rollers is substantially constant while drawing the drawable material (yarn, etc.) spanning the pair of tapered rollers a plurality of times (6 times). Thus, stability of running the drawable material is maintained while drawing the drawable material at a high draw ratio.

The drawable material may be introduced to the straight portion or may be introduced directly to the tapered portion. The drawn material may be delivered from the straight portion or may be delivered directly from the tapered portion. Where no straight portions are provided, flanges or the like may be provided, where necessary, at roller end portions in order to prevent the dropping out of the drawable material.

Roller Surface Temperature

In the present invention, the surface of each tapered roller is preferably heated to a desired temperature depending on the drawable material subjected to the drawing. Although continuous drawing at room temperature is possible depending on the type of the drawable material and conditions, the drawing device is desirably configured such that the roller surface can be normally set at any temperature within the range of 30° C. to 280° C. so as to further stabilize drawing. At a temperature lower than 30° C., the temperature difference from room temperature is small. If the temperature is made higher than 280° C., depending on its type, the drawable material may start melting and adhering to the roller surface, possibly resulting in fluffing or yarn breakage. A proper temperature should be set variously depending on the type of the drawable material and the conditions. In many cases, it is more desirable that the temperature can be set within the range of 70° C. to 260° C.

The softening temperature and the melting point of the drawable material rise with the progress of drawing, and the proper temperature changes gradually in accordance with the change of draw ratio. Therefore, the device desirably has a constitution such that the temperature can be adjusted individually in 2 to 8 zones in the lengthwise direction of the roller.

Figure 3A:
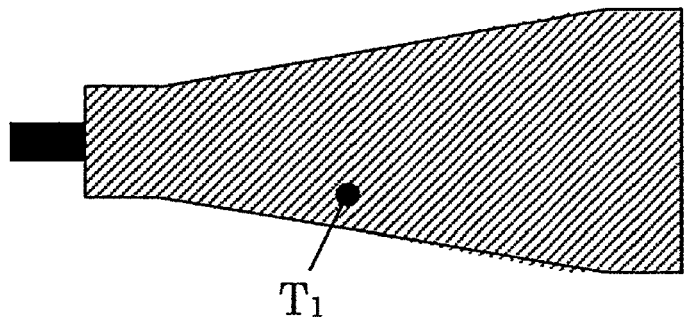
FIG. 3A is a schematic front cross-sectional view showing a first embodiment of the tapered roller used in the drawing device of the present invention.
Figure 3B:
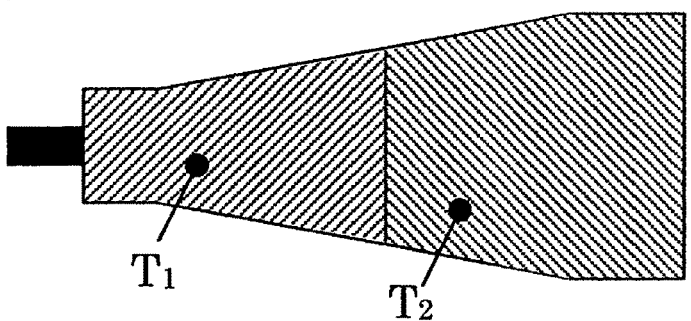
FIG. 3B is a schematic front cross-sectional view showing a second embodiment of the tapered roller used in the drawing device of the present invention.
Figure 3C:
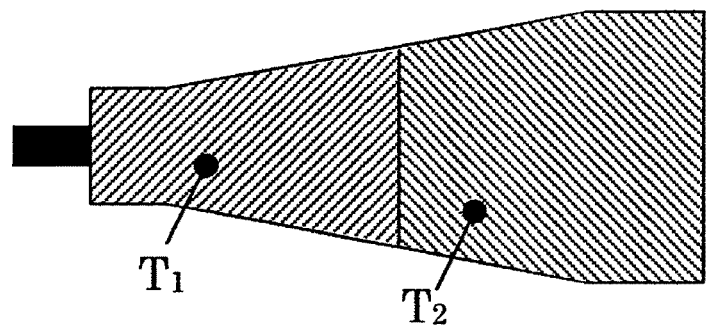
FIG. 3C is a schematic front cross-sectional view showing a third embodiment of the tapered roller used in the drawing device of the present invention.
Figure 3D:
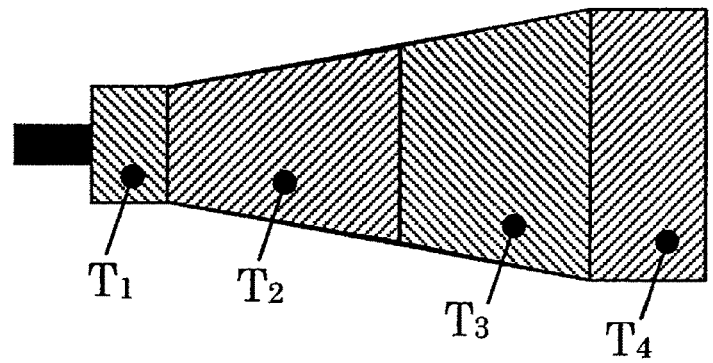
FIG. 3D is a schematic front cross-sectional view showing a fourth embodiment of the tapered roller used in the drawing device of the present invention.
Figure 3E:
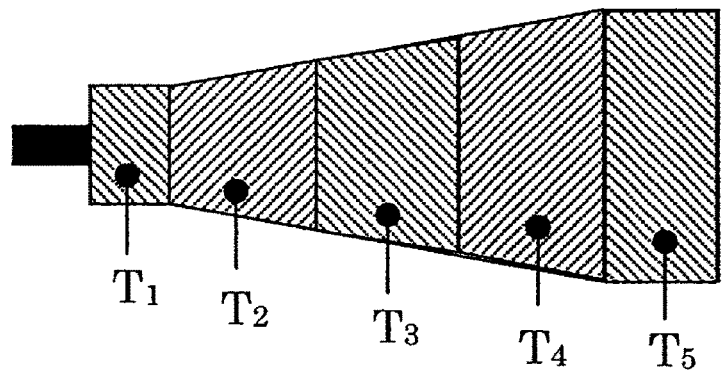
FIG. 3E is a schematic front cross-sectional view showing a fifth embodiment of the tapered roller used in the drawing device of the present invention.
Figure 3F:
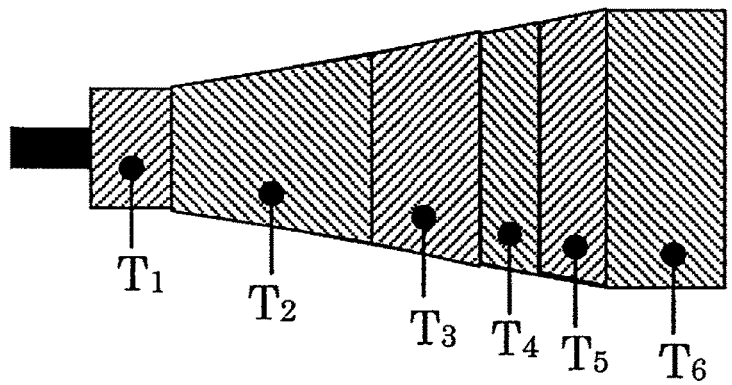
FIG. 3F is a schematic front cross-sectional view showing a sixth embodiment of the tapered roller used in the drawing device of the present invention.
Figure 3G:
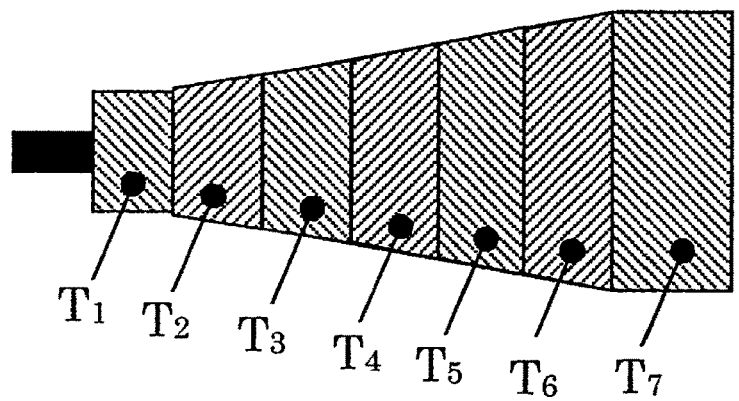
FIG. 3G is a schematic front cross-sectional view showing a seventh embodiment of the tapered roller used in the drawing device of the present invention.

FIGS. 3A to 3G show various embodiments of heating zones in the lengthwise direction of the roller. FIG. 3A shows an embodiment with a single heating zone ($T_1$). FIG. 3B shows an embodiment in which two heating zones ($T_1$, $T_2$) are provided, such that the front half portion and the rear half portion of the roller can be controlled to be heated at different temperatures. FIG. 3C shows an embodiment in which three heating zones are provided such that introduction and delivery straight portions $T_1$, $T_3$ and a tapered portion $T_2$ can be controlled to be heated at different temperatures. FIG. 3D shows an embodiment in which four heating zones are provided such that drawable material introduction and drawn material delivery straight portions $T_1$, $T_4$ and front-half and rear-half tapered portions $T_2$, $T_3$ can be controlled to be heated at different temperatures. FIG. 3E shows an embodiment in which five heating zones $T_1$, $T_2$, $T_3$, $T_4$, and $T_5$ are provided, FIG. 3F shows an embodiment in which six heating zones $T_1$, $T_2$, $T_3$, $T_4$, $T_5$, and $T_6$ are provided, and FIG. 3G shows an embodiment in which seven heating zones $T_1$, $T_2$, $T_3$, $T_4$, $T_5$, $T_6$, and $T_7$ are provided. The lengths of the respective heating zones may be the same or different from each other as shown in the drawings.

There are no particular limitations on a method of heating each roller, and each roller can be heated by an internal heating method or an external heating method.

The internal heating method is a method in which heating is performed from inside the roller, whereby the roller surface is heated through heat transfer. Examples of the internal heating method include: a method in which a heat medium heated at a high temperature, such as heated air, combustion gas, heated steam, or heated liquid, for example, water or oil, is circulated within the roller to perform heating; a method in which an induced current is generated in a magnetic material such as iron, nickel, manganese, or an alloy thereof disposed within the roller, thereby performing heating (induction heating) from the inside of the roller; and a method in which microwaves or high-frequency waves are generated from a high-permittivity material such as carbon, barium titanate ($BaTiO_3$), or lead zirconate titanate [$Pb(Zr, Ti)O_3$] disposed within the roller, thereby performing heating from inside the roller.

Examples of the external heating method include: a method in which a heat medium heated at a high temperature, such as heated air, combustion gas, or heated steam, is blown directly to the surface of the roller to heat the surface; a method in which a magnetic material such as iron, nickel, manganese, or an alloy thereof is disposed within the roller, and heated by induced current from the outside of the roller; a method in which a heat source disposed within the roller, such as a far-infrared radiation wire or a Nichrome wire, is brought into contact with the roller surface, or heat is emitted from the heat source to the roller surface, thereby performing heating.

In the case where a plurality of heating zones are provided in the lengthwise direction of the roller, each heating zone can be heated by heaters (heating units) provided inside or outside the roller for each heating zone.

In order to further stabilize drawing, the roller device set of FIG. 2 is encased in a hermetically closed room to maintain its temperature constant, whereby further stable drawing is performed. Furthermore, it is also effective to additionally heat the surface of the drawable material by hot air or by infrared radiation heating in the hermetically closed room.

In the case where drawing at a further high draw ratio is required, two to five continuous drawing devices each of which having the above-described constitution may be arranged in series, thereby constituting a multi-stage continuous drawing device which allows drawing at a further high draw ratio.

Drawing Method

A drawing method of the present invention is executed using the above-described drawing device including the pair of tapered rollers according to the present invention, spanning the pair of rollers of the drawing device with the drawable material, and performing drawing by running the drawable material while spanning (wrapping) the rollers with the drawable material a plurality of times from a small-diameter side of the tapered rollers to a large-diameter side of the tapered rollers.

Combination with Another Drawing Method

Where necessary, in addition to drawing performed by the drawing device of the present invention, drawing process of the drawable material further includes drawing by the other drawing method before or after the drawing performed by the drawing device of the present invention. Examples of the other drawing method include roller drawing with a straight roller, drawing with a pin, drawing with a plate, and drawing in a hot-air heating furnace. The drawing device such as a roller, a pin, or a plate may be provided with a heater (heating unit) such that the drawing may be performed by heat-drawing where necessary. Examples of the heating method by the heater include infrared radiation heating, hot-air heating, steam heating, heat medium heating, microwave heating, high-frequency wave heating, and dielectric heating or the like.

Drawing of Various Fibers

The drawing device according to the present invention is applicable to various synthetic fibers made of polyester, polyamide [nylon 6, nylon 66, nylon 9T (nylon composed of 1,9-nonamethylenediamine and/or 2-methyl-1,8-octamethylenediamine, and terephthalic acid), etc.], polyvinyl alcohol, polyolefin (polyethylene, polypropylene, etc.), polyoxymethylene, or the like. In particular, the drawing device according to the present invention is preferably applied to fibers manufactured by a melt spinning method, a semi-melt spinning method, and a dry spinning method. Proper drawing temperature is different depending on the material of the yarn. According to the drawing device of the present invention, it is possible to perform drawing at a desired roller surface temperature by selecting the heating method and heating conditions appropriately. According to the drawing device of the present invention, the roller may be partitioned to heating zones along the lengthwise direction and drawing can be performed at optimum drawing temperatures each corresponding to an initial stage of drawing, an intermediate stage of drawing, and a late stage of drawing.

It is possible to draw a spun yarn at a desired draw ratio of 1.2 times or higher, for example, at 10 times or higher by using the drawing device of the present invention. It is possible to perform plural-stage (multi-stage) drawing with a large number of stages by setting the number of times of spanning the pair of tapered rollers to 6 times or more, 10 times or more, or further large number of times such as 20 to 40 times. That is, it is possible to perform drawing at a high draw ratio while gradually drawing the drawable material. The drawing may be performed at an enhanced draw ratio, for example, by increasing the lengths of the pair of rollers, or by arranging a plurality of drawing devices in serial arrangement along the running direction of the yarn, where each device is constituted of a pair of rollers.

Since the drawing device of the present invention is constituted of the pair of rollers, it is possible to draw the yarn directly after spinning by introducing the yarn after spinning to the drawing device of the present invention constituted of the pair of tapered rollers while taking up the spun yarn without winding the yarn.

Drawing of Various Tapes or Sheets

The drawing device according to the present invention is applicable as a drawing device to draw a tape or sheet made of polyester, polyamide [nylon 6, nylon 66, nylon 9T (nylon composed of 1,9-nonamethylenediamine and/or 2-methyl-1,8-octamethylenediamine, and terephthalic acid), etc.], polyvinyl alcohol, polyolefin (polyethylene, polypropylene, etc.), polyoxymethylene, or the like. It is possible to manufacture a high-strength uniaxially drawn sheet, a flat yarn (tape yarn), a split yarn, or the like.

EXAMPLES

Next, the present invention will be described specifically based on examples. It should be noted that the present invention is not limited to the examples. Each measurement value in the examples and comparative examples described below was measured according to the following method.

[Intrinsic Viscosity (IV) of Polyethylene Terephthalate Resin]

A relative viscosity η of a solution prepared by dissolving a sample of 3 g in ortho-chlorophenol of 100 mL was measured at 25° C. by using an Ostwald viscometer, and IV was calculated by the following approximate formula:

IV=0.0242η+0.2634, where $\eta=(t \times d)/(t_0 \times d_0)$, t: a fall time (seconds) of a solution, $t_0$: a fall time (seconds) of ortho-chlorophenol, d: density (g/cc) of the solution, and $d_0$: density (g/cc) of ortho-chlorophenol.

[Relative Viscosity (RV) of Nylon 6 Resin, Nylon 66 Resin, and Nylon 9T Resin]

A sample solution was prepared by dissolving a sample in special grade concentrated sulfuric acid of 96.3±0.1% by weight such that a resin concentration was 10 mg/mL, and the relative viscosity of the solution was measured by using an Ostwald viscometer in which the number of seconds of water fall was 6 to 7 seconds at a temperature of 20° C.±0.05° C. A fall time $t_1$ (seconds) of the sample solution of 20 mL and a fall time $t_0$ (seconds) of the same sulfuric acid of 20 mL used in preparation of the sample solution were measured by using the same viscometer, and a relative viscosity RV was calculated by using the following formula based on the ratio of the falling times.

$RV=t_1/t_0$

[Measurement of Breaking Strength]

A breaking strength was obtained from a load-elongation curve obtained by using an Instron type tensile tester.

[Measurement of Elongation at Break]

An elongation at break was obtained from a load-elongation curve obtained by using an Instron type tensile tester.

Example 1

A polyethylene terephthalate resin having an intrinsic viscosity of 1.20 was fed to an extruder type melt spinning apparatus. Spinning was performed by using a spinneret having a discharge hole diameter of 0.6 mm and 144 holes, and a spun fiber yarn was passed through a heating tube at an atmospheric temperature of 300° C. Then, the spun fiber yarn was cooled by blowing cooling air thereto at a speed of 30 m/min from a cooling tube, and a spinning oil was applied thereto by an oiling roller. Then, without winding the spun fiber yarn, the spun fiber yarn was introduced to a drawing device (FIG. 2) including two pairs of tapered rollers (a: 150 mm, b: 400 mm, L: 700 mm, La: 120 mm, Lb: 250 mm) (θ: 12°) in a serial arrangement.

In the drawing device, the temperature of the surface of each roller was heated at 80° C. by internal heating performed through induction heating (FIG. 3A), and the yarn repeatedly spanned each pair of rollers (the total number of times of spanning: 28) to be drawn continuously (a total draw ratio: 7.1), and was wound at a winding speed of 4200 m/min, to obtain a drawn yarn. The measurement results of the breaking strength and the elongation of the drawn yarn are shown in Table 1.

Example 2

A nylon 6 resin having a relative viscosity of 2.53 was fed to an extruder type melt spinning apparatus. Spinning was performed by using a spinneret having a discharge hole diameter of 0.19 mm and 48 holes, and a spun fiber yarn was cooled by blowing cooling air thereto at a speed of 0.8 m/min and then was passed through a tube-shaped noncontact type heater. The yarn coming out of the heater was cooled spontaneously, and a spinning oil was applied thereto by an oiling roller. Then, the yarn was introduced to a continuous drawing device (FIG. 2) constituted of a pair of tapered rollers (a: 175 mm, b: 300 mm, L: 500 mm, La: 120 mm, Lb: 250 mm) (θ: 3°). Continuous drawing (a draw ratio: 1.7 times) was performed by repeatedly wrapping the yarn around the pair of rollers (the number of times of spanning: 10) in a state where a front-half heating zone and a rear-half heating zone were controlled such that roller surface temperatures therein were 120° C. and 220° C., respectively. Then, the yarn was wound at a winding speed of 7600 m/min, to obtain a drawn fiber yarn. The measurement results of the breaking strength and the elongation of the drawn yarn are shown in Table 1.

Example 3

A nylon 66 resin having a relative viscosity of 2.6 was fed to an extruder type melt spinning apparatus. Spinning was performed by using a spinneret having a discharge hole diameter of 0.6 mm and 144 holes, and a spun fiber yarn was cooled by blowing cooling air thereto at a speed of 20 m/min and then was passed through a tube-shaped noncontact type heater. The yarn coming out of the heater was cooled spontaneously, and a spinning oil was applied thereto by an oiling roller. Then, the yarn was introduced at a speed of 2500 m/min to a drawing device (FIG. 2) constituted of a pair of tapered rollers (a: 150 mm, b: 460 mm, L: 800 mm, La: 120 mm, Lb: 250 mm) (θ: 15°).

The drawing device was heated and controlled such that the front portion of the tapered portion (three zones) of the roller had a surface temperature ($T_2$) of 180° C., the center portion thereof had a surface temperature ($T_3$) of 220° C., the rear portion thereof had a surface temperature ($T_4$) of 235° C., where a temperature $T_1$ of the straight portion was the same as $T_2$, and a temperature $T_5$ of the straight portion was the same as $T_4$ (FIG. 3E). The yarn repeatedly spanned the pair of rollers (the number of spanning: 16) to be drawn (a draw ratio: 3.1), and was wound at a speed of 7700 m/min, to obtain a drawn yarn. The measurement results of the breaking strength and the elongation of the drawn yarn are shown in Table 1.

Example 4

A nylon 9T resin having a relative viscosity of 0.9 was fed to an extruder type melt spinning apparatus. Spinning was performed by using a spinneret having a discharge hole diameter of 0.25 mm and 72 holes, and a spun fiber yarn was cooled by blowing thereto, at a speed of 0.5 m/min, cooling air controlled to have a temperature of 25° C. and a humidity of 65 RH %. Then, a spinning oil was applied to the yarn by an oiling roller. Subsequently, the yarn was taken up at a speed of 1500 m/min by a take-up roller heated at 150° C. Then, without winding the yarn, the yarn was drawn at 1.5 times between second rollers heated at 180° C., and was further introduced to a continuous drawing device (FIG. 2) constituted of a pair of tapered rollers (a: 150 mm, b: 300 mm, L: 400 mm, La: 100 mm, Lb: 200 mm). In a state where each roller was heated such that, as three zones, the front portion ($T_2$) of the tapered portion had a surface temperature of 180° C., the center portion ($T_3$) thereof had a surface temperature of 200° C., the rear portion ($T_4$) thereof had a surface temperature of 205° C., where the temperature $T_1$ of the straight portion was the same as $T_2$, and the temperature $T_5$ of the straight portion was the same as $T_4$ (FIG. 3E). Continuous drawing (a draw ratio: 3 times) was performed by repeatedly spanning the pair of rollers (θ: 4°) with the yarn (the number of times of spanning: 18) to obtain a drawn fiber yarn. The measurement results of the breaking strength and the elongation of the drawn yarn are shown in Table 1.

Example 5

A nylon 9T resin having a relative viscosity of 2.6 was fed to an extruder type melt spinning apparatus. Spinning was performed by using a spinneret having a discharge hole diameter of 0.25 mm and 144 holes, and a spun fiber yarn was cooled by blowing thereto, at a speed of 0.5 m/min, cooling air controlled to have a temperature of 25° C. and a humidity of 65 RH %. Then, a spinning oil was applied to the yarn by an oiling roller. Subsequently, the yarn was introduced to a continuous drawing device (FIG. 2) constituted of a pair of tapered rollers (a: 150 mm, b: 300 mm, L: 400 mm, La: 100 mm, Lb: 200 mm). Without winding the yarn, the yarn was drawn continuously by repeatedly spanning the pair of rollers (θ: 4°) with the yarn in a state where each roller was heated and controlled such that, as three zones, the front portion ($T_2$) of the tapered portion had a surface temperature of 180° C., the center portion ($T_3$) thereof had a surface temperature of 180° C., the rear portion ($T_4$) thereof had a surface temperature of 190° C., where the temperature $T_1$ of the straight portion was the same as $T_2$, and the temperature $T_5$ of the straight portion was the same as $T_4$ (FIG. 3E). Subsequently, the yarn was introduced to a continuous drawing device (FIG. 2) constituted of a pair of tapered rollers (a: 150 mm, b: 300 mm, L: 400 mm, La: 100 mm, Lb: 200 mm), and spanned the pair of rollers (θ: 4°) repeatedly in a state where each roller was heated such that, as three zones, the front portion ($T_2$) of the tapered portion had a surface temperature of 190° C., the center portion ($T_3$) thereof had a surface temperature of 200° C., the rear portion ($T_4$) thereof had a surface temperature of 205° C., where the temperature $T_1$ of the straight portion was the same as $T_2$, and the temperature $T_5$ of the straight portion was the same as $T_4$ (FIG. 3E), to obtain a drawn fiber yarn (a total draw ratio: 4.0 times). The measurement results of the breaking strength and the elongation of the drawn yarn are shown in Table 1.

Example 6

A nylon 9T resin having a relative viscosity of 2.6 was fed to an extruder type melt spinning apparatus. Spinning was performed by using a spinneret having a discharge hole diameter of 0.25 mm and 144 holes, and a spun fiber yarn was cooled by blowing thereto, at a speed of 0.5 m/min, cooling air controlled to have a temperature of 25° C. and a humidity of 65 RH %. Then, a spinning oil was applied to the yarn by an oiling roller. Subsequently, the yarn was introduced to a continuous drawing device (FIG. 2) constituted of a pair of tapered rollers (a: 200 mm, b: 500 mm, L: 400 mm, La: 100 mm, Lb: 200 mm). Without winding the fiber yarn, the fiber yarn was drawn continuously by repeatedly spanning the pair of rollers (θ: 6°) with the yarn in a state where each roller was heated such that, as three zones, the front portion ($T_2$) of the tapered portion had a surface temperature of 180° C., the center portion ($T_3$) thereof had a surface temperature of 180° C., the rear portion ($T_4$)

thereof had a surface temperature of 190° C., where the temperature $T_1$ of the straight portion was the same as $T_2$, and the temperature $T_5$ of the straight portion was the same as $T_4$ (FIG. 3E). Subsequently, the yarn was introduced to a continuous drawing device (FIG. 2) constituted of a pair of tapered rollers (a: 200 mm, b: 300 mm, L: 400 mm, La: 100 mm, Lb: 200 mm), and was repeatedly wrapped around the pair of rollers (θ: 4°) in a state where each roller was heated such that, as three zones, the front portion ($T_2$) of the tapered portion had a surface temperature of 190° C., the center portion ($T_3$) thereof had a surface temperature of 200° C., the rear portion ($T_4$) thereof had a surface temperature of 200° C., where the temperature $T_1$ of the straight portion was the same as $T_2$, and the temperature $T_5$ of the straight portion was the same as $T_4$ (FIG. 3E). Subsequently, the yarn was introduced to a continuous drawing device (FIG. 2) configured with a pair of tapered rollers (a: 200 mm, b: 240 mm, L: 500 mm, La: 100 mm, Lb: 200 mm), and repeatedly spanned the pair of rollers (θ: 2°) in a state where each roller was heated such that, as three zones, the front portion ($T_2$) of the tapered portion had a surface temperature of 205° C., the center portion ($T_3$) thereof had a surface temperature of 210° C., the rear portion ($T_4$) thereof had a surface temperature of 215° C., where the temperature $T_1$ of the straight portion was the same as $T_2$, and the temperature $T_5$ of the straight portion was the same as $T_4$ (FIG. 3E), to obtain a drawn fiber yarn (a total draw ratio: 4.5 times). The measurement results of the breaking strength and the elongation of the drawn yarn are shown in Table 1.

Comparative Example 1

A polyethylene terephthalate resin having an intrinsic viscosity of 1.20 was fed to an extruder type melt spinning apparatus. Spinning was performed by using a spinneret having a discharge hole diameter of 0.6 mm and 144 holes, and a spun fiber yarn was passed through a heating tube at an atmospheric temperature of 300° C. Then, the spun fiber yarn was cooled by blowing cooling air thereto at a speed of 30 m/min from a cooling tube, and a spinning oil was applied thereto by an oiling roller. Then, the spun fiber yarn was taken up at a speed of 1400 m/min by a take-up roller heated at 70° C. Without winding the spun fiber yarn, the fiber yarn was drawn (a total draw ratio: 2.4 times) continuously at two stages [at two stages between the take-up roller (straight roller) and a first draw roller (straight roller) and between the first draw roller and a second draw roller (straight roller)]. After the drawing, the yarn was wound at a winding speed of 3400 m/min to obtain a drawn fiber yarn. The measurement results of the breaking strength and the elongation of the obtained drawn yarn are shown in Table 2.

Comparative Example 2

A polyethylene terephthalate resin having an intrinsic viscosity of 1.28 was fed to an extruder type melt spinning apparatus. Spinning was performed by using a spinneret having a discharge opening diameter of 0.6 mm and 288 holes, and a spun fiber yarn was passed through a heating tube at an atmospheric temperature of 300° C. Then, the spun fiber yarn was cooled by blowing cooling air thereto at a speed of 30 m/min from a cooling tube, and a spinning oil was applied thereto by an oiling roller. Then, the spun fiber yarn was taken up at a speed of 2000 m/min by a take-up roller heated at 80° C. Without winding the yarn, drawing (a total draw ratio: 2.32) was performed continuously at three stages with rollers (straight rollers) heated and controlled at 90° C., 110° C., and 245° C., respectively, and the yarn was wound at a winding speed of 4600 m/min to obtain a drawn fiber yarn. The measurement results of the breaking strength and the elongation of the obtained drawn yarn are shown in Table 2.

Comparative Example 3

A nylon 6 resin having a relative viscosity of 2.53 was fed to an extruder type melt spinning apparatus. Spinning was performed by using a spinneret having a discharge hole diameter of 0.25 mm and 48 holes, and a spun fiber yarn was cooled by blowing cooling air thereto at a speed of 0.8 m/min and then was passed through a tube-shaped noncontact type heater. The yarn coming out of the heater was cooled spontaneously, and a spinning oil was applied thereto by an oiling roller. Then, the yarn was taken up at a speed of 4500 m/min by a take-up roller at normal temperature. Without winding the yarn, the yarn was drawn (a draw ratio: 1.21) between the take-up roller (straight roller) and a second roller (straight roller) heated and controlled at 120° C., and the yarn was wound at a winding speed of 5450 m/min, to obtain a drawn fiber yarn. The measurement results of the breaking strength and the elongation of the obtained drawn yarn are shown in Table 2.

Comparative Example 4

A nylon 66 resin having a relative viscosity of 2.6 was fed to an extruder type melt spinning apparatus. Spinning was performed by using a spinneret having a discharge hole diameter of 0.6 mm and 144 holes, and a spun fiber yarn was cooled by blowing cooling air thereto at a speed of 20 m/min. Then, the yarn was passed through a tube-shaped noncontact type heater. The yarn coming out of the heater was cooled spontaneously, and a spinning oil was applied thereto by an oiling roller. Then, the yarn was wound at a speed of 3500 m/min to obtain an undrawn fiber yarn.

The obtained undrawn fiber yarn was fed to a roller (straight roller) heated at 180° C. Subsequently, the yarn was drawn (a total draw ratio: 2.14) at three stages using rollers (straight rollers) heated at 220° C., 230° C., and 235° C., respectively, and the yarn was wound at a winding speed of 2500 m/min to obtain a drawn fiber yarn. The measurement results of the breaking strength and the elongation of the obtained drawn yarn are shown in Table 2.

Comparative Example 5

A nylon 9T resin having a relative viscosity of 0.9 was fed to an extruder type melt spinning apparatus. Spinning was performed by using a spinneret having a discharge hole diameter of 0.25 mm and 72 holes, and a spun fiber yarn was cooled by blowing thereto, at a speed of 0.5 m/min, cooling air controlled to have a temperature of 25° C. and a humidity of 65 RH %. Then, a spinning oil was applied to the yarn by an oiling roller. Subsequently, the yarn was taken up at a speed of 1500 m/min by a take-up roller (straight roller) heated at 150° C. Without winding the yarn, the yarn was drawing (a draw ratio: 1.8 times) using a second roller (straight roller) heated at 180° C., to obtain a drawn fiber yarn.

Comparative Example 6

A nylon 9T resin having a relative viscosity of 2.6 was fed to an extruder type melt spinning apparatus. Spinning was performed by using a spinneret having a discharge hole diameter of 0.25 mm and 144 holes, and a spun fiber yarn was cooled by blowing thereto, at a speed of 0.5 m/min, cooling air controlled to have a temperature of 25° C. and a humidity of 65 RH %. Then, a spinning oil was applied to the yarn by an oiling roller. Subsequently, the yarn was taken up at a speed of 2000 m/min by a take-up roller heated and controlled at 180° C. Without winding the yarn, the yarn was drawn (a draw ratio: 2.3 times) using a second roller (straight roller) heated at 190° C., to obtain a drawn fiber yarn.

From the results of the examples and the comparative examples, it is understood that multi-stage drawing can be performed by the tapered roller type drawing device according to the present invention, and therefore, it is possible to achieve a yarn (having high breaking strength) with high drawing effect.

In the conventional methods shown in the above comparative examples, although there may be a possibility of enhancing the drawing effect, for example by increasing the stage of drawing, such a modification requires additional space for the additional mechanical component. Where the volume of space for the mechanical components is taken into consideration, the tapered roller type drawing device according to the present invention has remarkable advantage.

field of manufacturing synthetic fibers, the field of manufacturing synthetic resin tapes and sheets, the field of manufacturing of synthetic fiber manufacturing apparatuses, the field of manufacturing of synthetic resin tape or sheet manufacturing apparatuses, and the like.

Although the preferred embodiments of the present invention have been described above with reference to the accompanying drawings, those skilled in the art will readily conceive various changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A drawing device for drawing a drawable material, the drawing device comprising
    at least a pair of tapered rollers each having a taper ratio in a range of 0.035 to 0.50,
    wherein the taper ratio is represented by $(\beta-\alpha)/2L$,
    where $\beta$ denotes a maximum diameter of the roller, $\alpha$ denotes a minimum diameter of the roller, and L denotes a length of a tapered portion of the roller; and
    wherein each of the tapered rollers has a ratio $\beta/\alpha$ in a range of 1.2 to 5.0 between the maximum diameter $\beta$ and the minimum diameter $\alpha$; and

TABLE 1

|  |  | Example 1 | Example 2 | Example 3 | Example 4 | Example 5 | | Example 6 | | |
|---|---|---|---|---|---|---|---|---|---|---|
| Raw material resin | | Polyester | Nylon 6 | Nylon 66 | Nylon 9T | Nylon 9T | | Nylon 9T | | |
| Spinning/drawing | | Continued | Continued | Continued | Continued | Continued | | Continued | | |
| Number of times of spanning (effective number of drawing stages) | | 28 | 10 | 16 | 18 | 36 | | 54 | | |
| Tapered roller specifications | $(\beta/\alpha)$ | 2.67 | 2.67 | 1.71 | 3.07 | 2.00 | 2.00 | 2.00 | 2.50 | 1.50 | 1.20 |
| | $(\beta-\alpha)/(2L)$ | 0.179 | 0.179 | 0.125 | 0.194 | 0.188 | 0.188 | 0.188 | 0.375 | 0.125 | 0.040 |
| | L (mm) | 700 | 700 | 500 | 800 | 400 | 400 | 400 | 400 | 400 | 500 |
| | La (mm) | 120 | 120 | 120 | 120 | 100 | 100 | 100 | 100 | 100 | 100 |
| | Lb (mm) | 250 | 250 | 250 | 250 | 200 | 200 | 200 | 200 | 200 | 200 |
| | $\theta$ (°) | 12 | 12 | 3 | 15 | 4 | 4 | 4 | 6 | 4 | 2 |
| Total draw ratio (times) | | 7.1 | 1.7 | 3.1 | 3.0 | 4.0 | | 4.5 | | |
| Draw-winding speed (m/min) | | 4200 | 7600 | 7700 | 4500 | 8000 | | 6750 | | |
| Fiber breaking strength (cN/dtex) | | 8.7 | 7.9 | 9.3 | 3.6 | 4.2 | | 4.6 | | |
| Fiber elongation at break (%) | | 10.2 | 18.3 | 6.1 | 9.8 | 8.8 | | 7.9 | | |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Raw material resin | Polyester | Polyester | Nylon 6 | Nylon 66 | Nylon 9T | Nylon 9T |
| Spinning/drawing | Continued | Continued | Continued | Continued | Continued | Continued |
| Number of drawing stages | 2 | 3 | 1 | 3 | 1 | 1 |
| Total draw ratio (times) | 2.4 | 2.32 | 1.21 | 2.14 | 1.8 | 2.3 |
| Draw-winding speed (m/min) | 3400 | 4600 | 5450 | 2500 | 2700 | 4600 |
| Fiber breaking strength (cN/dtex) | 7.5 | 7.2 | 5.7 | 7.4 | 2.1 | 2.6 |
| Fiber elongation at break (%) | 18.3 | 13.9 | 39.0 | 9.2 | 28.2 | 22.1 |

INDUSTRIAL APPLICABILITY

Since the present invention provides a drawing device having a compact constitution and a drawing method using the same device which enable drawing of synthetic fibers, or synthetic resin tapes or sheets at a high draw ratio. Therefore, the present invention is industrially applicable in the the pair of tapered rollers are arranged such that an angle $\theta$ formed between center axes of rotation shafts of the pair of rollers is in a range of $0.001° \leq \theta \leq 10°$.

2. The drawing device according to claim 1, wherein each tapered roller includes non-tapered straight portions at a drawable material introduction portion and a drawable material delivery portion.

3. The drawing device according to claim 1, wherein a surface of each of the tapered rollers is heated at a predetermined temperature.

4. The drawing device according to claim 3, wherein the surface of each tapered roller is heated by internal heating or by external heating.

5. The drawing device according to claim 3, wherein each of the tapered rollers includes a plurality of heating zones partitioned along a lengthwise direction of the roller, and temperatures of the respective heating zones are individually settable.

6. The drawing device according to claim 1, wherein a plurality of the pairs of tapered rollers are provided such that multi-stage drawing of the drawable material can be performed a plurality of times.

7. The drawing device according to claim 1, wherein the drawable material is a yarn.

8. The drawing device according to claim 7, wherein the yarn is a monofilament or a multifilament.

9. The drawing device according to claim 7, wherein the pair of tapered rollers are arranged adjacent to a spinning device such that a spun yarn can be drawn directly without winding the yarn after the spinning.

10. The drawing device according to claim 1, wherein the drawable material is a thermoplastic resin tape or a thermoplastic resin sheet.

11. A drawing method for a drawable material, comprising:

spanning a pair of rollers of a drawing device with a drawable material, the device including at least a pair of tapered rollers each having a taper ratio represented by $(\beta-\alpha)/2L$ in a range of 0.035 to 0.50, where $\beta$ denotes a maximum diameter of the roller, $\alpha$ denotes a minimum diameter of the roller, and L denotes a length of a tapered portion of the roller; wherein each of the tapered rollers has a ratio $\beta/\alpha$ in a range of 1.2 to 5.0 between the maximum diameter $\beta$ and the minimum diameter $\alpha$; and the pair of tapered rollers are arranged such that an angle $\theta$ formed between center axes of rotation shafts of the pair of rollers is in a range of $0.001°\leq\theta\leq10°$; and drawing the drawable material by running the drawable material while spanning the rollers with the drawable material a plurality of times from a small-diameter side of the tapered rollers to a large-diameter side of the tapered rollers.

12. The drawing method according to claim 11, wherein the drawable material is a yarn.

13. The drawing method according to claim 12, wherein the yarn is introduced onto the tapered rollers without winding the yarn after spinning.

14. The drawing method according to claim 12, wherein the tapered rollers are heated, and the yarn is drawn while heating the yarn by the heated rollers.

15. The drawing method according to claim 11, wherein the plurality of times is equal to or greater than 6 times.

16. The drawing method according to claim 12, wherein multi-stage drawing is performed a plurality of times on the yarn by a drawing device including a plurality of pairs of tapered rollers.

17. The drawing method according to claim 11, wherein the drawable material is a thermoplastic resin tape or a thermoplastic resin sheet.

* * * * *

UNITED STATES PATENT AND TRADEMARK OFFICE
CERTIFICATE OF CORRECTION

Page 1 of 1

PATENT NO. : 10,106,919 B2
APPLICATION NO. : 14/751261
DATED : October 23, 2018
INVENTOR(S) : Hideki Kamada et al.

It is certified that error appears in the above-identified patent and that said Letters Patent is hereby corrected as shown below:

On the Title Page

Item (63), the Related U.S. Application Data information has been omitted. Item (63) should read:
--Related U.S. Application Data
(63) Continuation of Application No. PCT/JP2013/085175,
filed on Dec. 27, 2013--

Signed and Sealed this
Twenty-eighth Day of May, 2019

Andrei Iancu
*Director of the United States Patent and Trademark Office*